G. W. SWARTZ.
SELF PROPELLED VEHICLE.
APPLICATION FILED MAY 8, 1918.
1,310,772.
Patented July 22, 1919.
2 SHEETS—SHEET 1.
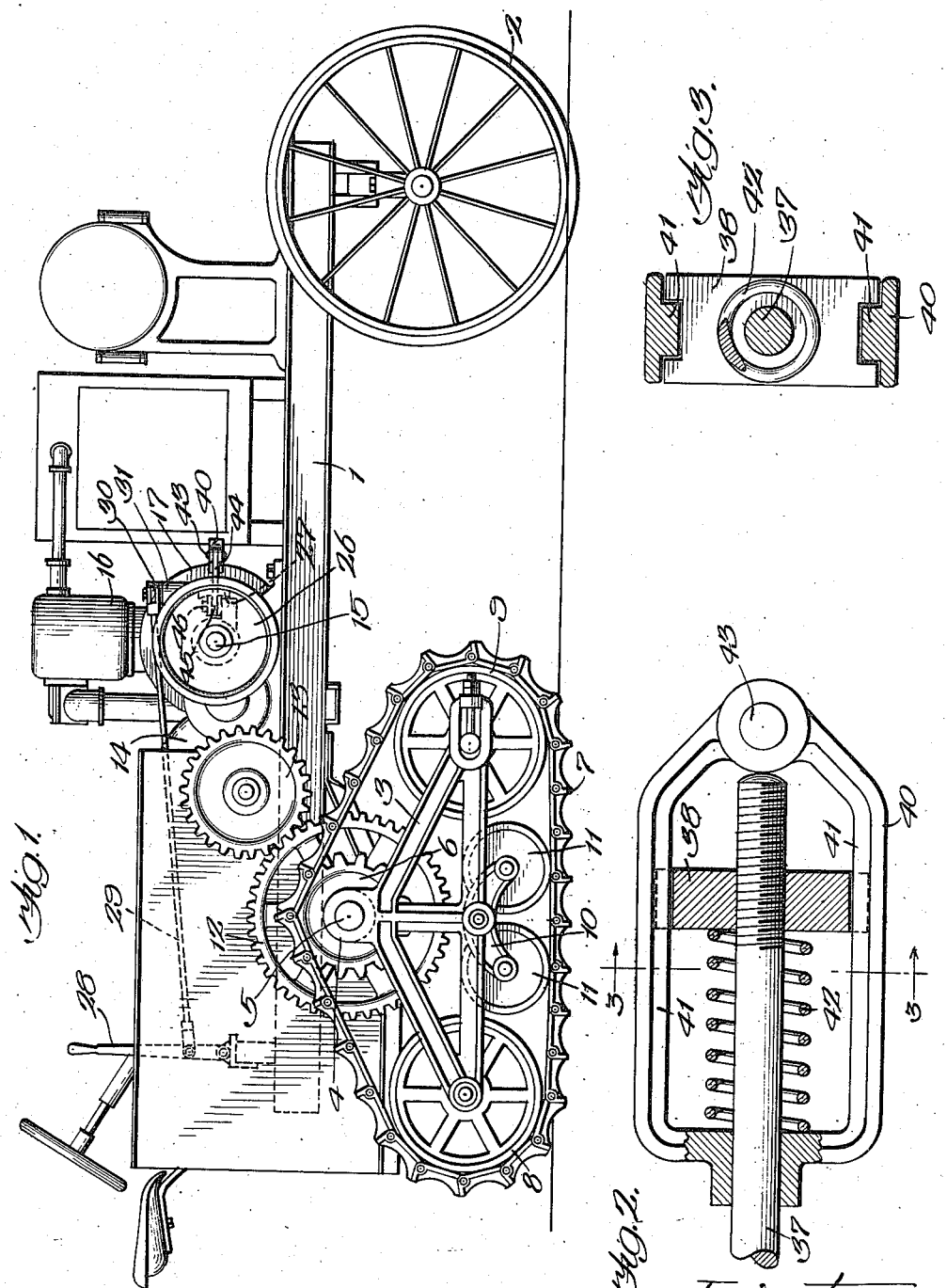
Inventor:
George W. Swartz
By G. L. Gragg Atty

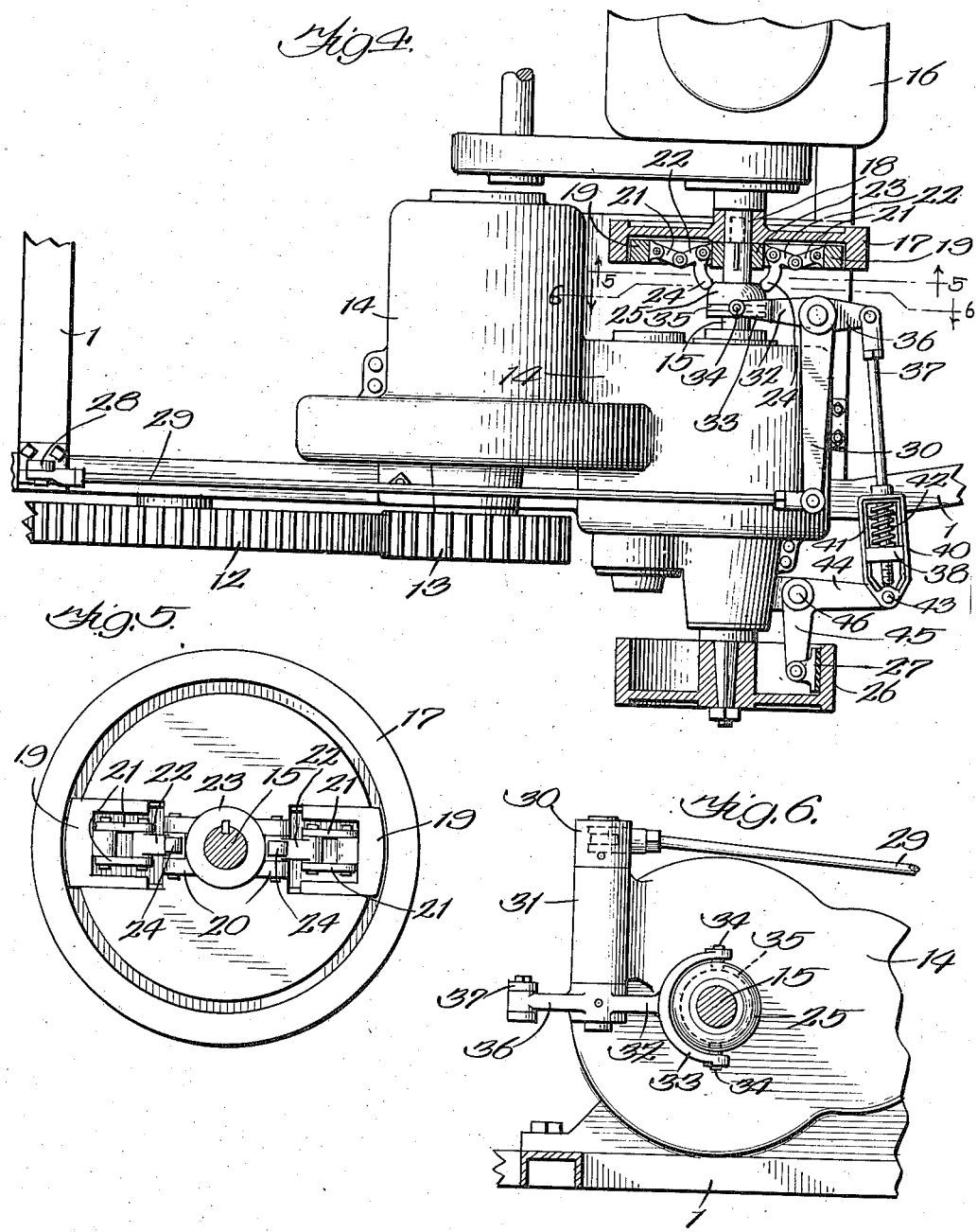

UNITED STATES PATENT OFFICE.

GEORGE W. SWARTZ, OF PEORIA, ILLINOIS, ASSIGNOR TO ACME HARVESTING MACHINE COMPANY, OF PEORIA, ILLINOIS, A CORPORATION OF WEST VIRGINIA.

SELF-PROPELLED VEHICLE.

1,310,772.   Specification of Letters Patent.   Patented July 22, 1919.

Application filed May 8, 1918. Serial No. 233,251.

*To all whom it may concern:*

Be it known that I, GEORGE W. SWARTZ, citizen of the United States, residing at Peoria, in the county of Peoria and State of Illinois, have invented a certain new and useful Improvement in Self-Propelled Vehicles, of which the following is a full, clear, concise, and exact description.

My invention relates to self-propelled vehicles and has for its general object the reduction in the number of manually operated controlling levers. The invention resides in the employment of clutch mechanism for bringing the prime mover that drives the running gear of a self-propelled vehicle into and out of driving connection with said running gear, brake mechanism associated with the running gear for checking the travel of the vehicle, a manually controlled lever common to such brake and clutch mechanisms, and operating connections between said lever and said brake and clutch mechanisms, these connections being interrelated each to be effective to actuate the mechanism pertaining thereto when the other is effective to release the mechanism pertaining thereto.

I employ means for delaying the effective application of the brake until the clutch is released, this means preferably residing in a spring included in the formation of the connection that associates the brake mechanism with the aforesaid lever and through which spring the force that is necessary to apply the brake is transmitted.

I will explain my invention more fully by reference to the accompanying drawings showing the preferred embodiment thereof and in which Figure 1 is a side view illustrating one form of self-propelled vehicle in which my invention is embodied; Fig. 2 is a longitudinal sectional view of a portion of the connection between the lever and the brake mechanism, this figure illustrating the association of the spring through which the brake is operated; Fig. 3 is a sectional view on line 3—3 of Fig. 2; Fig. 4 is a plan view illustrating an engine, a portion of the running gear contiguous to the engine, the brake mechanism, clutch mechanism, and the connections by which the brake and clutch mechanisms are actuated in orderly sequence; Fig. 5 is a sectional view on line 5—5 of Fig. 4; and Fig. 6 is a sectional view on line 6—6 of Fig. 4.

Like parts are indicated by similar characters of reference throughout the different figures.

The vehicle illustrated is one which employs endless tracks on which the rear vehicle wheels turn and which tracks are caused to travel in their orbits to effect the propulsion of the vehicle. The invention however is not to be limited to the employment of such tracks.

In the vehicle illustrated the main frame 1 is supported at its forward end upon steering vehicle wheels 2 and at its rear end upon two truck structures, one upon each side of the main frame. Each truck structure includes a main truck frame 3 preferably of triangular formation with the base of the truck frame lowermost and the apex or upper part of the truck frame formed into sleeves 4 that turn upon a bearing 5. The bearings 5 upon the opposite sides of the main vehicle frame are the ends of a shaft hung upon the main vehicle frame. A gear or pinion 6 upon each side of the vehicle is suitably driven by the prime mover upon the vehicle and in turn drives the contiguous endless track 7 which is made up of links formed to mesh with the driving gear. Wheels 8 and 9 are mounted upon the ends of the main truck frame, the aforesaid gear being equidistant from these wheels and above the plane of their axes. These wheels 8 and 9 serve, in conjunction with said gear, to define the orbit in which the track is moved by the gear. A sub-truck frame including two similar rigidly united parts 10 is swingingly mounted upon the base of the main truck frame and carries wheels 11 that bear upon the bottom stretch of the track. The wheels 8, 9 and 11 are load bearing wheels as they support the rear of the vehicle. The truck is adapted to swing clockwise and counter-clockwise, each end of the truck and the wheels 8 or 9 thereon being movable toward and from the main vehicle frame 1.

The running gear of the vehicle shown in

Figs. 1 and 4, in addition to the parts thereof already described, includes a gear 12 coaxial with and fixed with respect to the pinion 6, a pinion 13 meshing with the gear 12, other gearing for operating the pinion 13 and included in a gear casing 14, and a shaft 15 at the beginning of the train of gears. The primer mover 16 is preferably in the form of an internal combustion hydrocarbon engine. This engine has a fly-wheel 17 fixed upon the engine shaft 18. This fly-wheel constitutes one member of clutch mechanism whereby the engine may be coupled with the running gear and uncoupled therefrom. The complemental member of the clutch mechanism includes clutching shoes 19, slides 20 upon which these shoes may be radially moved into and out of engagement with the rim of the fly-wheel, and toggle joints each including links 21 connected with the shoes 19 and links 22 connected with a carrier 23 that is in fixed connection with the shaft 15. The links 22 carry knuckles 24 which are employed in straightening the toggle joints when the clutch is to be applied. The element of the clutch mechanism that comprises the parts 19, 20, 21, 22, 23 and 24 constitutes a part of the running gear in view of its permanent connection with the running gear shaft 15. A clutching collar 25 is disposed about the shaft 15 and moves longitudinally thereof. When this clutching collar is moved toward the clutch the clutch is actuated to couple the engine shaft 18 and the running gear shaft 15. When the clutching collar is moved away from the clutch the clutch is released to uncouple said engine and the running gear shafts. When the clutch is released the brake is applied.

The brake mechanism illustrated includes a brake drum 26 which is fixed upon some shaft or other rotating part of the running gear. The brake shoe 27 is adapted to be engaged with the interior surface of the rim of the brake drum after the engine shaft 18 and the running gear shaft 15 are uncoupled. A single manually controlled lever 28 is common to the brake and clutch mechanisms, movement of this lever in one direction effecting actuation of the clutch mechanism and release of the brake while movement of this lever in the other direction releases the clutch mechanism and effects the application of the brake. This lever 28 operates through a link 29 and an arm 30 that is pivotally connected with the forward end of the link and which is mounted upon a vertical bearing 31 which is carried by the gear casing 14. An arm 32 is in fixed connection with the arm 30 and terminates in a fork 33 which carries pins 34 that enter the groove 35 in the clutching collar 25. When the lever 28 is moved rearwardly the arm 30 is turned in a clockwise direction to turn the arm or operating connection 32 in a similar direction to actuate the clutch mechanism that causes the coupling of the engine and the running gear. When the movement of the lever 28 is reversed the arm or connection 32 is moved to release the clutch mechanism. Another arm 36 is also in fixed relation to the arm 30. A rod 37 is connected with the outer end of the arm 36. A crosshead 38 is assembled with the rod 37 by being threaded thereon. A stirrup 40 carries crosshead guides 41 which direct the crosshead 38 in its travel. A spring 42 surrounds one end of the rod 37 and is interposed between the crosshead and one end of the stirrup. The other end of the stirrup is an abutment for rod 37 and is pivotally connected at 43 with the arm 44 that in turn is in fixed connection with the arm 45. These two arms swing together at 46 upon the gear case 14. The brake shoe 27 is carried by the arm 45. When the clutching collar 25 is moved outwardly to release the clutch mechanism the arm 36 and the other elements of the connection between the arm 30 and the brake shoe are moved to apply the brake shoe 27 to the brake drum 26 to check the running gear. The braking force is applied through the spring 42 and is not effective until this spring has been placed under certain compression. As constructed, the rod 37 is pulled upon, when the brake is to be applied, to cause the movement of the crosshead 38 against the spring 42. By this arrangement it is apparent that the effective application of the brake is delayed until the clutch has been released and that the clutch is applied when the brake is released.

By the construction illustrated and described the single lever 28 is alone employed for governing the clutch and brake mechanisms and causing the actuating and release of these mechanisms in orderly sequence.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

A self-propelled vehicle including an engine having a fly-wheel which constitutes one element of a clutch mechanism; vehicle running gear in separable relation to said engine; a second clutch mechanism element forming a part of said running gear; a clutching collar for engaging the aforesaid elements of the clutch mechanism to couple the engine with the running gear; a brake drum driven by the running gear; a braking element applicable to the brake drum; an operating lever common to the clutch and brake mechanisms; an arm connected with said lever; a second arm in actuating relation to said clutching collar and fixedly connected with the first arm; a third arm also fixedly connected with the first arm; a rod connected with the third arm; a crosshead connected with said rod; a stirrup having one end operatively connected with said braking element; and a spring interposed between the other end of the stirrup and the aforesaid crosshead.

In witness whereof, I hereunto subscribe my name this eighth day of April A. D., 1918.

GEORGE W. SWARTZ.